Figure 1:
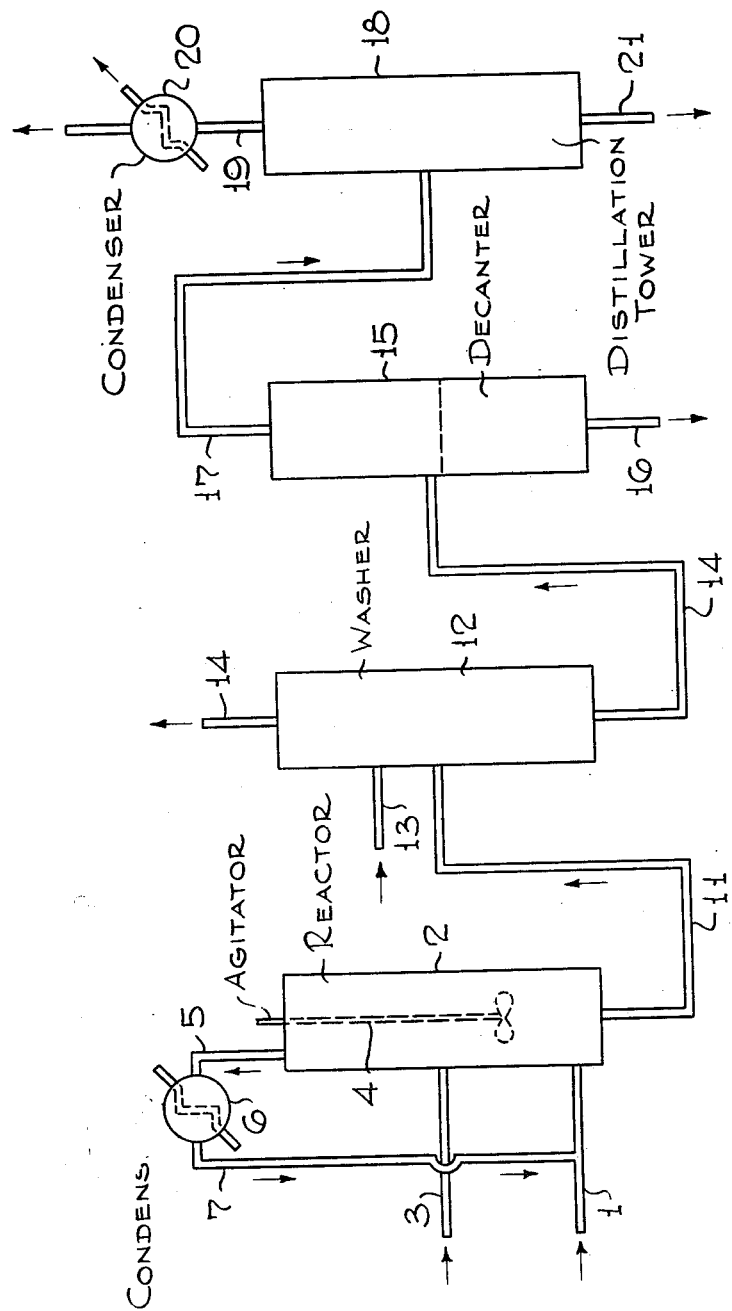
Figure 2:
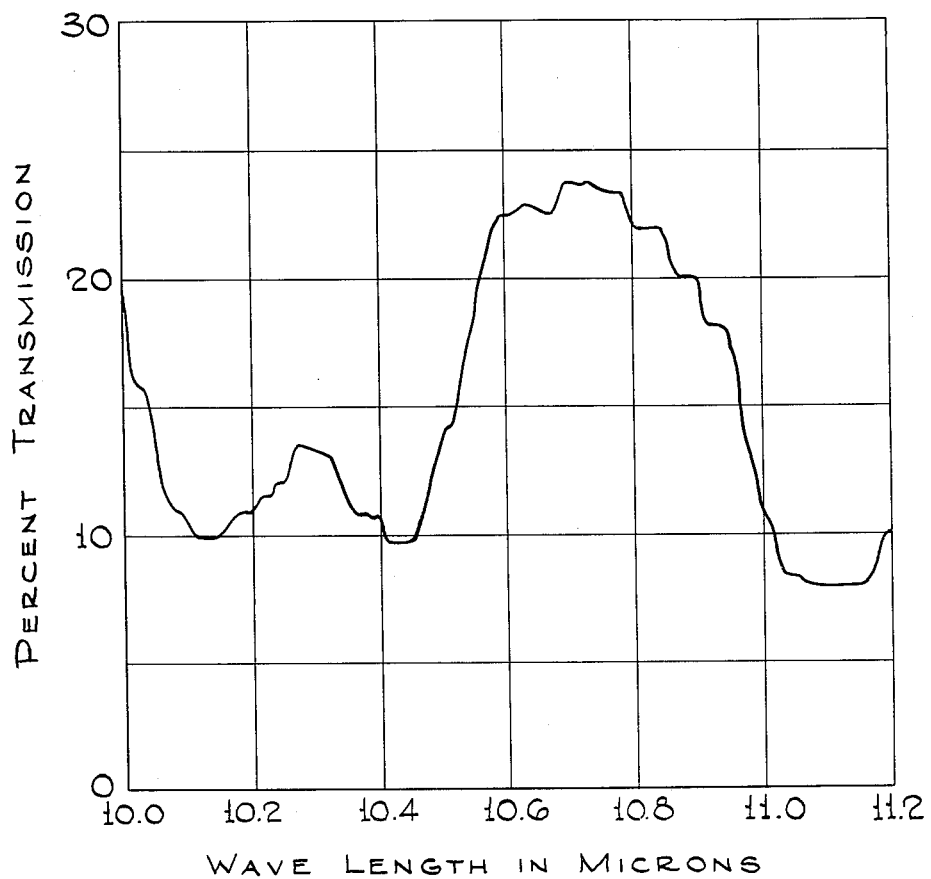

July 15, 1952     D. W. YOUNG     2,603,665
POLYMERIZATION OF ETHYLENE IN PRESENCE OF ALUMINUM
CHLORIDE-METHYL CHLORIDE SOLUTION
Filed Nov. 18, 1948     2 SHEETS—SHEET 2

David W. Young Inventor
By Henry Berk Attorney

Patented July 15, 1952

2,603,665

UNITED STATES PATENT OFFICE 2,603,665

POLYMERIZATION OF ETHYLENE IN PRESENCE OF ALUMINUM CHLORIDE-METHYL CHLORIDE SOLUTION

David W. Young, Roselle, N. J., assignor to Standard Oil Development Company, a corporation of Delaware Application November 18, 1948, Serial No. 60,710

3 Claims. (Cl. 260—683.15)

This invention relates to an improved process for the selective production of valuable low molecular weight ethylene polymers. More particularly it is concerned with an improvement in the method of effecting and controlling the polymerization of ethylene in the presence of a Friedel-Crafts type catalyst in a process designed to obtain predominantly straight chain alpha olefin polymers containing 10 to 20 carbon atoms per molecule.

Ethylene has been polymerized under pressure and reduced temperatures with peroxide type catalysts to obtain solid wax-like polymer products which have molecular weights above 4,000, and are useful in the manufacture of synthetic resins. Varying the operating conditions under which ethylene is polymerized with these catalysts, has not led to the production of reactive lower molecular weight polyethylenes such as made by this process.

Ethylene under certain conditions is comparatively inert in the presence of Friedel-Crafts catalysts. Ethylene has thus been used as an inert diluent in the polymerization of isoolefins with a diolefin to make butyl rubber where a Friedel-Crafts metallic halide in solution is used as the catalyst and temperatures of about −103° C. are employed.

Some polymerization of the ethylene can be obtained by raising the temperature of the polymerization process to about −78° C., and using large amounts of Friedel-Crafts catalyst in alkyl halide or carbon disulphide solutions. The reaction is slow and yields of polyethylenes having molecular weights of approximately 100 to 3,000 are obtained only after 48 hours of operation. The resultant polyethylenes are highly cyclized due to the long reaction time required and the products are of little value as olefins because the iodine number is low. The products have, in addition, an undesirable terpene like odor.

$P_2O_5$ on kieselguhr has also been employed as a catalyst in an attempt to polymerize ethylene to lower molecular weight liquid fractions. This catalyst is ineffective on pure ethylene even under pressure and of only slight effectiveness in copolymerizing ethylene with propylene. The copolymers obtained as a result of this process, in any case, have a low iodine number and they contain some tertiary carbons in the chain and they are of less value than the present pure ethylene polymer.

It has now been found that ethylene can be selectively polymerized to yield valuable low molecular weight liquid products through the utilization of a specific catalyst, aluminum chloride-ethyl chloride, at about atmospheric temperatures.

The polyethylene polymers obtained by the process of this invention are believed to be new and these products include appreciable quantities of $a$ olefins and are free of tertiary olefins.

It is to be understood that whenever the term "selectively polymerizing" is used hereafter, that it connotes the formation of these before-mentioned products.

Fig. I is a flow diagram of the process of the invention.

Fig. II is a graph based on a spectrophotometric study of the polyethylene products of the invention showing the percent transmission plotted against the wave length.

This invention will be better understood by reference to the flow diagram shown in Figure I.

Referring to the drawing, gaseous ethylene is supplied through line 1 to a lower portion of reactor 2. A saturated solution of $AlCl_3$ in ethyl chloride enters reactor 2 through line 3. Stirrer 4 agitates the mixture of aluminum chloride in ethyl chloride and reactant materials and products thoroughly as good agitation must be used. Unreacted ethylene gas, ethyl chloride and slight amounts of ethylene dimer having a B. P. below that of ethyl chloride 12° C., leave reactor 2 through line 5 and condenser 6 where the ethyl chloride is condensed and returned to the reactor. Ethylene and its dimer if present are recycled to reactor 2 through line 7. The conversion per pass is not high and if desired more than one reactor may be used.

The polyethylenes are removed along with the catalyst from reactor 2 through line 11 to washer 12. Water and other $AlCl_3$ solvents if desired enter washer 12 through line 13 and by removing the $AlCl_3$ prevents further isomerization of the polyethylenes. Gases such as ethylene and some ethyl chloride leave washer 12 through line 14 and can be recycled, recovered or discarded. The mixture of polyethylenes, water and ethyl chloride is then sent to decanter 15 through line 14 where the mixture separates into an organic and water layer. The water layer is removed through line 16 and discarded. The organic layer is removed through line 17 to distillation zone 18.

Ethyl chloride is removed overhead from distillation zone 18 through line 19 and propane cooled condenser 20. Ethane or ethylene and similar products may be used to cool condenser 20 so that the ethyl chloride is condensed. The ethyl chloride taken overhead is preferably then used with additional AlCl₃ in the form of additional catalyst. Pure ethylene polymers in the desired range are removed through line 21. If desired different cuts can be fractionated to get individual fractions.

Experimental data were obtained on the production of ethylene polymers by the method of this invention and are presented in the following examples.

*Example I*

Ethylene gas was added to a lower portion of the liquid aluminum chloride-ethyl chloride solution. Some polymerization was obtained shortly after the ethylene gas was added. The total time of the experiment was about 1 hour. At the end of the run 500 mm. of isopropyl alcohol with 500 mm. of cold water was added in order to remove the aluminum chloride in solution form. The water layer was discarded and the ethyl chloride was distilled off. The polyethylene product was washed with ether and dried over calcium sulphate. Inspections are reported on the product:

S. gr. 20/20 _____ 0.8466
Per cent C _____ 86.07
Per cent H _____ 13.59
Per cent Cl _____ less than 1%
Iodine No. (Iodine-mercuric acetate method) _____ 120.1 (cg. I/g.)
Viscosity at 38° C. (C. S.) _____ 47.60
Color _____ Light yellow On the basis of other experiments it has been found in general that the specific gravity at 20/20 varies in the range of 0.82 to 0.85, the iodine number varies in the range of 100 to 150 and the boiling point varies in the range of 165° C. to 335° C.

The color has been found to be in the range of 8 to 12 on the Gardner-Holdt scale, a scale used in the varnish industry.

*Example II*

The polyethylene products of this invention were studied on the spectrophotometer. A sample containing cell 0.1 mm. thick was used with no dilution of the polymer product. A graph of the percent transmission plotted against the wave length is shown in Figure II.

The present transmission in the range of 5 to 25% at a wave length of 10 to 11 microns indicates quite clearly that the olefins obtained are predominantly of alpha olefinic character with some, i. e. up to 20%, or somewhat higher, other straight chain olefins. The entire graph indicates an absence of tertiary olefins and that the compounds are predominantly straight chain in character.

*Example III*

A polyethylene product of this invention was sulfonated with acetic anhydride-sulfuric acid reagent. A polypropylene sample having a similar number of carbon atoms as the polyethylene product used in this test was also sulfonated in the same manner. The sulfonates prepared from the polyethylene were distinctly superior in their detergency action in hard water and this demonstrates that the polyethylenes of this invention differ from other polymers in the same carbon number range, $C_{12}$–$C_{18}$.

The conditions for the operation of the process of this invention are temperature in the range of 0° to 40° C. and preferably in the range of 0° to 20° C., and at about atmospheric pressure.

The time interval during which the polyethylene products formed are allowed to remain in solution with the catalyst is determined by the temperatures at which the reaction is conducted. Thus the time interval varies inversely with the temperature as it is desired to avoid undue isomerization and cyclization of the polymers. Therefore while a 3 hour time interval has been found suitable at 12° C. only a ½ hour interval is best at 20° C.

The aluminum chloride-ethyl chloride catalyst is used in the form of concentrated solution, i. e., 2 to 7 grams and preferably 5 to 7 grams of aluminum chloride per hundred ml. of ethyl chloride. The solution of the aluminum chloride is preferably made at the boiling point of the ethyl chloride and also preferably is done in a dark place. When the solution takes place in the presence of light the catalyst turns a dark red in color and is not as active.

The ratio of catalyst to feed is approximately 500 ml. of active catalyst to about 2 to 20 cubic feet of ethylene per hour.

Other aluminum chloride organic solvent systems have been found not to possess the desired effect of producing the alpha olefin polymers of this invention. Thus for example in other experiments it was found aluminum chloride in heptane, zinc chloride in methyl chloride, aluminum chloride in nitro methane and aluminum chloride in carbon disulphide were not effective for polymerizing ethylene under the conditions of operation of the process of this invention. Very poor results and very low yields were obtained with these before-listed systems.

The nature of the olefins obtained by the process of this invention, i. e., their predominantly alpha olefinic character, freedom from tertiary olefins, and liquid characteristics at atmospheric temperature renders them especially suitable for many uses.

The products of this invention can be alkylated on benzene, toluene, xylene, etc., and then sulphonated to form synthetic detergents. The polymer products of this invention may be alkylated on phenol or 4 alkoxyphenols and the resultant products are antioxidants for wax, oil, rubber, gasoline, etc. The polymers of this invention can be sulphonated, nitrated, chlorinated, oxidized, etc., to form new chemical compounds which have value as solvents and plasticizers. Also, these new materials may be used as wire drawing lubricants.

The polyethylene polymers may also be further polymerized with solid aluminum chloride to form synthetic lubricating oils.

Other advantages of the process of this invention reside in the economy of operation resulting from the use of atmospheric pressures and temperatures with the consequent easy control features.

It is to be understood that this invention is not limited to the specific examples which have been offered merely as illustrations and that modifications may be made without departing from the spirit of the invention.

What is claimed is:

1. A process for producing $C_{10}$–$C_{20}$ polyethylene polymers of predominantly straight chain alpha olefinic character which comprises contacting ethylene in the gaseous phase with a saturated aluminum chloride-ethyl chloride solution catalyst in a polymerization zone at a temperature in the range of 0-20° C. and at atmospheric pressure; withdrawing a mixture of the resulting polyethylenes along with catalyst solution from the reaction zone; washing the mixture with water to remove aluminum chloride in a washing zone; decanting the washed mixture into an organic layer and a water layer and distilling the ethyl chloride from the organic layer to leave the polyethylene product as a residual product.

2. A process as in claim 1 including the additional step of taking overhead vaporized ethyl chloride from the polymerization zone; condensing the vaporized ethyl chloride and returning the resulting condensate to the polymerization zone.

3. A process for producing $C_{10}$–$C_{20}$ polyethylene polymer products of predominantly straight chain alpha olefinic character which comprises the steps of contacting ethylene in the gaseous phase with a saturated aluminum chloride-ethyl chloride solution catalyst in a polymerization zone at a temperature in the range of 0-20° C. and at atmospheric pressure; withdrawing overhead from the polymerization zone a gaseous mixture of ethylene, ethyl chloride and slight amounts of ethylene dimer; condensing this gaseous mixture to the point where the ethyl chloride is condensed; returning the resultant mixture of gaseous ethylene, ethylene dimer and liquid ethyl chloride to the polymerization zone; withdrawing a mixture of the resulting polyethylenes along with catalyst solution from the reaction zone; washing the mixture with water to remove aluminum chloride in a washing zone; decanting the washed mixture into an organic layer and a water layer and distilling the ethyl chloride from the organic layer to leave the polyethylene product as a residual product.

DAVID W. YOUNG.

REFERENCES CITED

The following references are of record in the file of this patent:

UNITED STATES PATENTS

| Number | Name | Date |
| --- | --- | --- |
| 2,159,148 | Haeuber et al. | May 23, 1939 |
| 2,329,714 | Grasshof | Sept. 21, 1943 |
| 2,377,266 | Reid | May 29, 1945 |
| 2,437,356 | Hill | Mar. 9, 1948 |
| 2,443,210 | Upham | June 15, 1948 |
| 2,458,977 | Carmody | Jan. 11, 1949 |

FOREIGN PATENTS

| Number | Country | Date |
| --- | --- | --- |
| 682,055 | France | May 22, 1930 |